Figure 1:
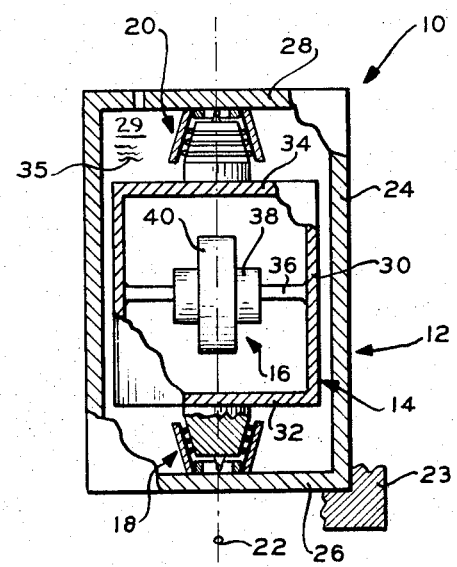

United States Patent [19]
Stiles et al.

[11] 3,837,229
[45] Sept. 24, 1974

[54] GIMBAL SLIP RING

[75] Inventors: John C. Stiles, Morris Plains; William C. Albert, Boonton, both of N.J.

[73] Assignee: The Singer Company, Little Falls, N.J.

[22] Filed: June 15, 1972

[21] Appl. No.: 262,994

[52] U.S. Cl. .................... 74/5 R, 310/232, 339/5 L
[51] Int. Cl. ........................................... G01c 19/16
[58] Field of Search ............... 339/5 L; 74/5 R, 5.7; 310/232

[56] References Cited
UNITED STATES PATENTS

| | | | |
|---|---|---|---|
| 2,966,744 | 1/1961 | Mueller | 74/5 X |
| 3,168,666 | 2/1965 | Grobel | 339/5 L X |
| 3,216,262 | 11/1965 | Swarts et al. | 74/5 |
| 3,396,586 | 8/1968 | Maclin et al. | 310/232 X |
| 3,530,728 | 9/1970 | Evans et al. | 74/5 |

OTHER PUBLICATIONS

"Mercury Brush Electrical Connector–Emmitter" by J. T. Richardson, May, 1967, Vol. 9, No. 12, Pg. 1704, of IBM Technical Disclosure Bulletin.

*Primary Examiner*—Manuel A. Antonakas
*Attorney, Agent, or Firm*—T. W. Kennedy

[57] ABSTRACT

A gimbal assembly comprising, an outer gimbal having a longitudinal axis, an inner gimbal pivotally supported by the outer gimbal coaxially therewith, a motor mounted on the inner gimbal with the motor having motor leads, a pivot unit pivotally connecting the inner gimbal to the outer gimbal coaxially therewith at one end thereof, and a slip ring unit pivotally connecting the inner gimbal to the outer gimbal coaxially therewith at the other end thereof with the slip ring unit being connected to the motor leads.

8 Claims, 10 Drawing Figures

PATENTED SEP 24 1974 3,837,229

SHEET 1 OF 2

3,837,229

GIMBAL SLIP RING

The present invention relates to a gimbal slip ring device, and particularly to a miniature gimbal brush and slip ring device having liquid metal brushes for use in a navigation instrument.

A conventional navigation instrument, such as a single-axis gyroscope, includes a gimbal assembly having an outer gimbal and an inner gimbal, which is supported by the outer gimbal, and includes a rotor, which is supported by the inner gimbal, a pivot unit, which pivotally connects the outer gimbal to the inner gimbal at one end thereof, a second pivot unit, which pivotally connects the outer gimbal to the inner gimbal at the other end therof, and a brush and slip ring unit, which is disposed adjacent to said second pivot unit.

A conventional brush and slip ring device for a single-axis gyro, or gyroscope, includes an outer brush assembly and an inner slip ring assembly. The conventional outer brush assembly includes a hollow, outer cylindrical support member having a longitudinal axis, and a plurality of axially spaced brush members, which have respective leads, and which are resiliently mounted on the inner surface of the hollow, outer, cylindrical support member. The conventional inner slip ring assembly includes a cylindrical, inner support member, which is journaled in the hollow, cylindrical, outer support member for angular displacement relative thereto about the longitudinal axis, and includes a plurality of axially-spaced, solid metal rings, which are fixedly mounted on the inner support member, and which have respective leads for providing power to said rotor.

One problem with the conventional brush and slip ring device is that the inner slip ring assembly of the device is not able to transmit substantially large acceleration forces to the outer brush assembly.

Accordingly, it is one object of the present invention to provide a gimbal assembly which has a brush and slip ring device that has an inner slip ring assembly and an outer brush assembly and that is capable of transmitting a substantial acceleration force therethrough.

It is another object of the present invention to provide a gimbal assembly which has a brush and slip ring device according to the aforementioned object for use in a navigation instrument, and which has an inner gimbal and an outer gimbal, wherein the brush and slip ring device pivotally connects the inner gimbal to the outer gimbal and electrically interconnects motor leads mounted on the inner gimbal to power supply leads mounted on the outer gimbal.

To the fulfillment of these and other objects, the invention provides a gimbal assembly having a brush and slip ring device including, an outer brush assembly, an inner slip ring assembly, and a plurality of liquid metal brush rings disposed therebetween, wherein the liquid metal slip rings are adapted to transmit acceleration force therethrough and are adapted to electrically connect motor leads mounted on the inner slip ring assembly to power supply leads mounted on the outer brush assembly.

Figure 2:
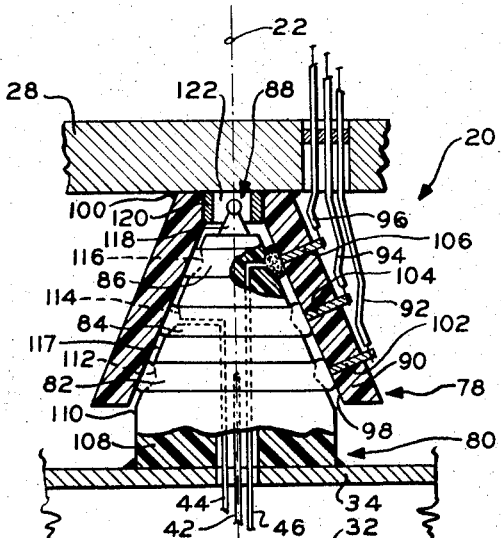
Figure 4:
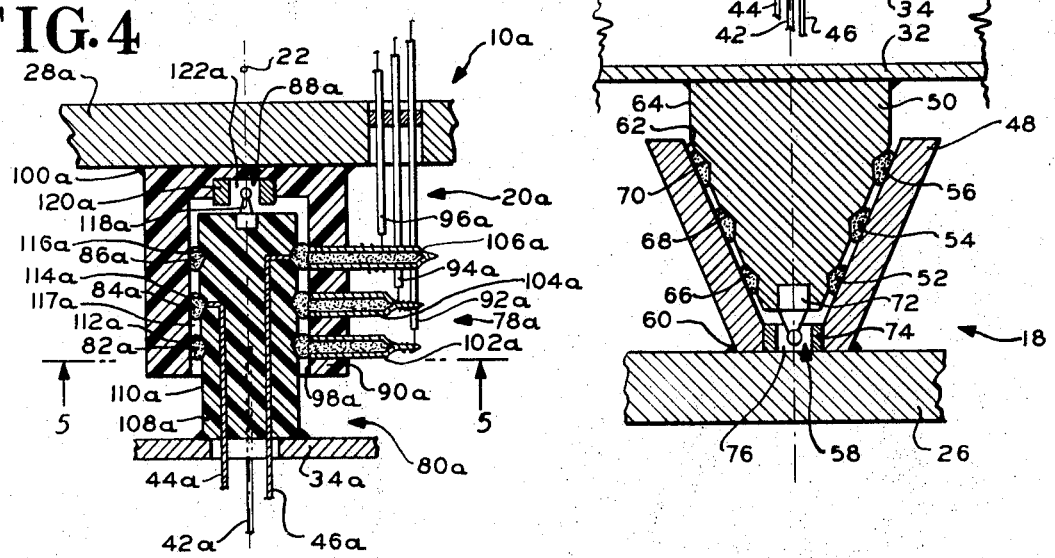
Figure 5:
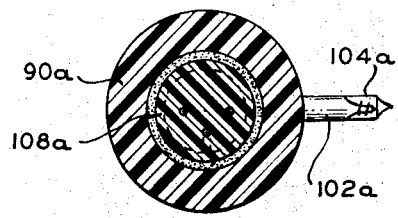
Figure 3:
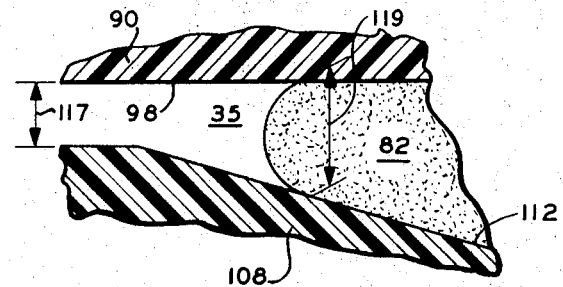
Figure 6:
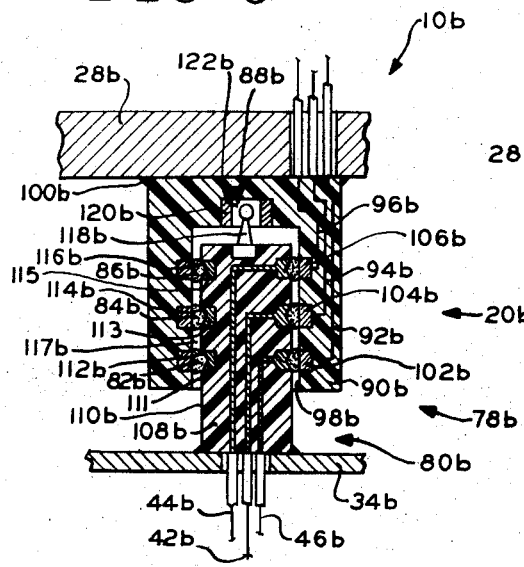
Figure 7:
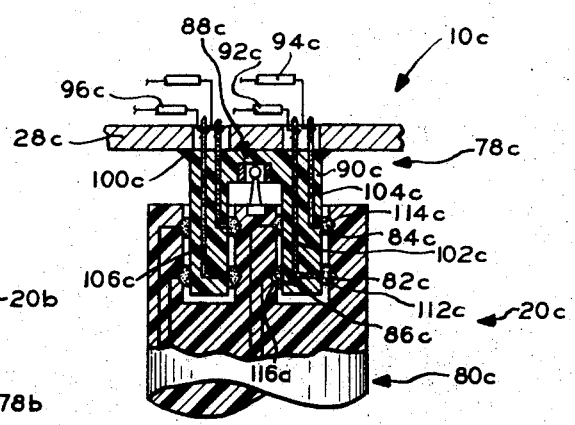
Figure 8:
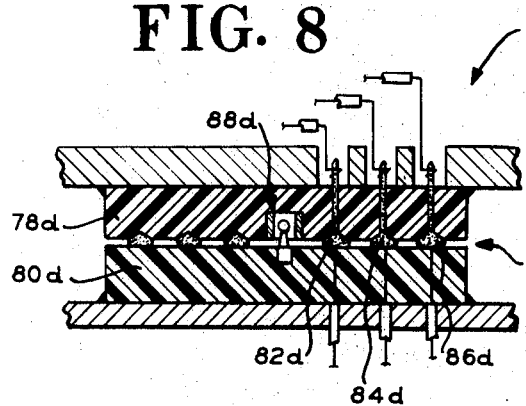
Figure 9:
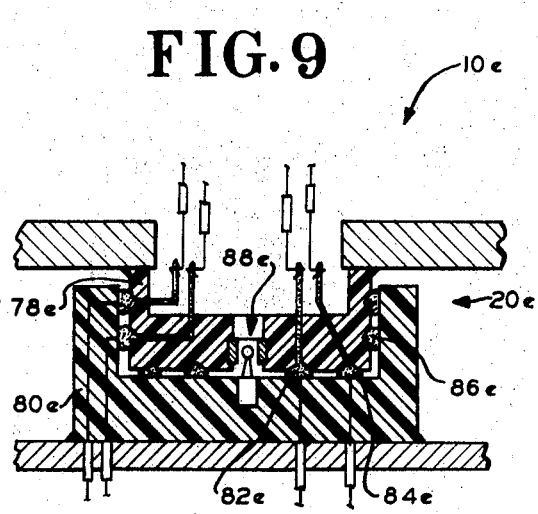
Figure 10:
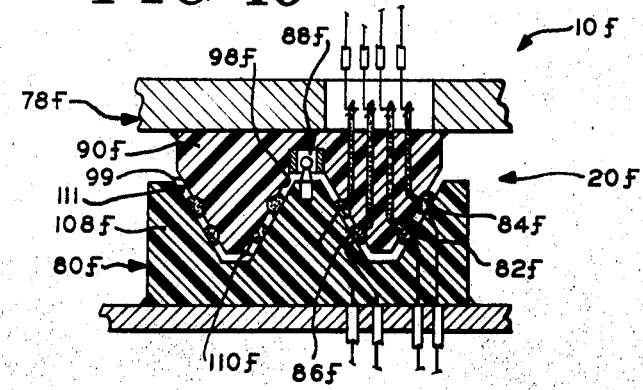

Other objects of the invention will become apparent upon reading the following description and accompanying drawings, wherein like parts are designated by like numerals throughout the several views, and wherein:

FIG. 1 is a sectional view of a single-axis gyroscope embodying features of the present invention;
FIG. 2 is an enlarged view of a portion of FIG. 1;
FIG. 3 is an enlarged view of a portion of FIG. 2;
FIG. 4 is an enlarged view showing a modified portion forming a second embodiment of the present invention;
FIG. 5 is a section view as taken along the line 5—5 of FIG. 5;
FIG. 6 is an enlarged view showing a modified portion forming a third embodiment of the present invention;
FIG. 7 is an enlarged view showing a modified portion forming a fourth embodiment of the present invention;
FIG. 8 is an enlarged view showing a modified portion forming a fifth embodiment of the present invention;
FIG. 9 is an enlarged view showing a modified portion forming a sixth embodiment of the present invention; and
FIG. 10 is an enlarged view showing a modified portion forming a seventh embodiment of the present invention.

Referring to FIG. 1, one embodiment of the present invention is a single-axis gyroscope 10. Gyroscope 10 includes an outer gimbal 12, an inner gimbal 14, which is supported by outer gimbal 12, a rotor 16, which is supported by inner gimbal 14, a pivot unit 18, which pivotally connects outer gimbal 12 to inner gimbal 14 at one end thereof, and a brush and slip ring unit 20, which pivotally connects outer gimbal 12 to inner gimbal 14 at the other end thereof.

Gimbals 12, 14 and units 18, 20 are coaxially aligned along a longitudinal axis 22. Gyro 10 is mounted on a support member 23, such as a navigation platform, as shown schematically in FIG. 1. Gyro 10 is shown with its axis 22 disposed in a vertical position for ease of illustration. Gyro 10 may also be mounted with its axis 22 in a horizontal position to suit some platforms.

Outer gimbal 12, which is a hollow, cylindrical body, includes a peripheral wall 24, and a pair of axially-spaced end walls 26, 28, which enclose a cavity 29.

Inner gimbal 14, which is also a hollow, cylindrical body includes a peripheral wall 30, and a pair of axially spaced end walls 32, 34. Cavity 29 preferably contains a selected fluid 35, such as an inert gas.

Rotor 16 includes a shaft 36, which is fixedly mounted on inner peripheral wall 30, a stator 38, which is fixedly mounted on shaft 36, and a flywheel 40, which is rotatably mounted on stator 38 for rotation relative thereto.

Rotor 16 (FIG. 2) has a plurality of motor leads 42, 44, 46 for supply of power to stator 38. A power source (not shown), which is disposed outside outer gimbal 12 supplies power to stator 38 through brush and slip ring unit 20 and leads 42, 44, 46.

Pivot unit 18 (FIG. 2) includes an outer support member 48, an inner support member 50, a plurality of bearing rings 52, 54, 56, and an aligning device 58. Outer support member 48 is disposed coaxially with and axially outwardly of inner support member 50. Aligning device 58 is preferably adapted to align outer support member 48 with inner support member 50 along axis 22.

Outer support member 48, which is composed of a metal, is fixedly connected to end wall 26 by a connector 60, such as a weld fillet. Outer support member 48 has an inner surface 62, which faces inner member 50.

Inner support member 50 has an outer surface 64, which faces inner surface 62. Outer surface 64 has a plurality of V-shaped grooves 66, 68, 70, which respectively receive bearing rings 52, 54, 56. Bearings rings 52, 54, 56 are preferably composed of liquid metal, such as liquid mercury, or liquid mercury alloy.

Aligning device 58 includes a pivot pin 72, which is fixedly connected to inner support member 50, and includes a pivot bearing 74, which is fixedly connected to outer support member 48. Pivot bearing 74 is preferably a jewel bearing. Pin 72 and bearing 74 are separated by a predetermined clearance 76 in order to assure that pin 72 transmits substantially no axial load and transverse load therethrough, and in order to assure that substantially all axial load and transverse load is transmitted from inner support member 50 through bearing rings 52, 54, 56 to outer support member 48.

Brush and slip ring unit 20 (FIG. 2) includes an outer brush assembly 78, which is mounted on outer wall 28, and an inner slip ring assembly 80, which is mounted on inner wall 34, a plurality of brush rings 82, 84, 86, and an aligning device 88. Outer assembly 78 is disposed coaxially with and axially outwardly of inner slip ring assembly 80. Aligning device 88 is preferably included in order to help to align outer assembly 78 with inner assembly 80 along axis 22 and to limit the relative transverse displacement therebetween; but aligning device 88 can be omitted from unit 20.

Outer brush assembly 78 includes an outer support member 90, and a plurality of power leads 92, 94, 96, which respectively engage brush rings 82, 84, 86. Outer support member 90 has an inner surface 98 which faces slip ring assembly 80. Outer support member 90, which is composed of an electrically non-conductive material, is fixedly connected to end wall 28 by a connector 100, such as an adhesive, or the like.

Power leads 92, 94, 96 have respective terminals 102, 104, 106, which are supported by and extend through outer support member 90. Terminals 102, 104, 106 respectively engage rings 82, 84, 86, which respectively engage motor leads 42, 44, 46.

Inner slip ring assembly 80 includes an inner support member 108, which supports motor leads 42, 44, 46, and which is disposed axially inwardly of outer support member 90. Inner support member 108 has an outer surface 110, which faces inner surface 98. Outer surface 110 has a plurality of V-shaped grooves 112, 114, 116, which respectively receive brush rings 82, 84, 86. Inner support member 108 may be formed by a molding operation. Leads 42, 44, 46 may be disposed in place during the molding operation. Grooves 112, 114, 116 may be formed by a machining operation, which follows the molding operation. Grooves 112, 114, 116 are ring-shaped in a peripheral direction and are V-shaped in cross-section.

Ring-shaped brushes, or rings, 82, 84, 86 (FIGS. 2 and 3) are preferably composed of liquid metal, such as liquid mercury, or a liquid mercury alloy. Members 90 and 108 are composed of preselected materials so that the cohesive forces in each of the mercury rings 82, 84, 86 are greater than the adhesive forces therein. Thus, each of the mercury rings 82, 84, 86 in cross-section, has opposite faces, each face having a convex, arcuate shape, whereby the mercury rings 82, 84, 86 are confined, in cross-section, within their respective grooves 112, 114, 116. Opposite surfaces 98, 110 are separated by a gap 117 of preselected size. Each ring 82 or 84 or 86 has a critical edge spacing 119 (FIG. 3), which is located adjacent to the face thereof, and which varies in thickness according to the variation in thickness of gap 117.

Aligning device 88 includes a pivot pin 118, which is fixedly connected to inner support member 108, and a pivot bearing 120, which is fixedly connected to outer support member 90 and which is preferably a jewel bearing. Pin 118 and bearing 120 are separated by a determined clearance 122 to assure that any axial load and transverse load is transmitted from inner support member 108 through brush rings 82, 84, 86 to outer support member 90. The thickness of clearance 122 is preferably larger than the thickness of gap 117, so that acceleration load and impact load passes through slip ring unit 20.

In one embodiment of gyro 10, the outer diameter of outer support member 90 adjacent to ring 86 was about 0.100 inches, and rings 82, 84, 86 were spaced at a center-to-center spacing of about 0.015 inches, and the axial width of each of the rings 82, 84, 86 was about 0.007 inches, and gap 117 had a thickness which was about 0.002 inches.

The dimensions (FIG. 3) of depth, width and wall slope of each of the grooves 112, 114, 116 are selectively determined so that each of the mercury rings 82, 84, 86 centers itself within its groove, and so that its ring edge spacing 119 is greater in thickness than gap 17.

Gap 117 normally has an approximately uniform thickness. Thermal axial expansion of inner gimbal 14 relative to outer gimbal 12 causes an approximately uniform change in the thickness of gap 117. Axial acceleration force on inner gimbal 14 also causes an approximately uniform change in the thickness of gap 117. Radial acceleration force on inner gimbal 14 causes a non-uniform change in the thickness of gap 117.

During the thermal, axial expansion of inner gimbal 14 relative to outer gimbal 12, rings 82, 84, 86 apply an axial reaction force against inner gimbal 14 along axis 22. Upon the application of an axial, acceleration force by inner gimbal 14 toward end wall 28, rings 82, 84, 86 apply an equal and opposite reaction force against inner gimbal 14. Upon the application of a radial acceleration force by inner support member 108 of inner gimbal 14, rings 82, 84, 86 apply an equal and opposite reaction force on inner support member 108; and the reaction force of each mercury ring 82, 84, 86 is a function of the unequal, peripheral pressure distribution of the liquid mercury caused therein and is proportional to the weight and volume of the displaced mercury.

FIG. 3 shows a cross-sectional view of the arcuate, convex shape of the edge of mercury ring 82. The following equation describes the equilibrium condition of the forces acting on a unit circumferential increment of mercury ring 82.

$$P_M X = 2 \sigma \cos \theta + P_G X$$

where:
$P_M$ = pressure of the mercury ring 82,
$P_G$ = pressure of the inert gas 35, $\sigma$ = surface tension force of the mercury ring 82, $\theta$ = the contact angle formed by the surface tension force of the mercury ring 82 and the inner surface 98, $X$ = thickness of the gap in the groove 112 adjacent the edge surface of mercury ring 82.

The above formula indicates that mercury ring 82 will center itself in groove 112, provided that groove 112 has preselected dimensions and provided that the material of members 90, 108 are compatible with the mercury of ring 82. A displacement of member 108 relative to member 90 caused by a thermal expansion load, or caused by an axial or radial acceleration force, is self-compensating within a limited range, because a slight change in the dimension $X$ brings about a new equilibrium condition.

There are a number of advantages to embodiment 10 which are summarized hereafter. First, friction in brush and slip ring unit 20 is substantially minimized whereby drift error in gyroscope 10 is minimized. Second, brush and slip ring unit 20 is inherently selfprotecting against contamination, chemical attack and foreign particles due to the arrangement of its portions whereby the reliability and life of said unit 20 is extended. Third, the difficulty of alignment of brushes 82, 84, 86 is minimized whereby the cost of manufacture of unit 20 is minimized. Fourth, the conductive paths through rings 82, 84, 86 have a relatively low resistance whereby such rings are not damaged by relatively excessive currents. Fifth, wearing of the parts of brush and slip ring unit 20 is substantially minimized so that the life of the unit is extended. Sixth, the spacing between adjacent rings 82, 84, 86 can be minimized to a size of about 0.015 inches, whereby miniaturization of brush and slip ring unit 20 is facilitated.

A second embodiment 10a of the present invention is shown in FIGS. 4 and 5. Parts of second embodiment 10a which are like the parts of embodiment 10 have like numerals, but with a subscript "a" added thereto. Embodiment 10a (FIG. 4) includes a brush and slip ring unit 20a. Unit 20a includes an outer brush assembly 78a, which is mounted on inner wall 34a, a plurality of brush rings 82a, 84a, 86a, and an aligning device 88a. Aligning device 88a aligns outer assembly 78a with inner assembly 80a along axis 22a.

Outer brush assembly 78a includes an outer support member 90a, and a plurality of power leads 92a, 94a, 96a, which respectively engage brush rings 82a, 84a, 86a. Outer support member 90a, has an inner surface 98a, which faces slip ring assembly 80a. Outer member 90a, which is composed of an electrically nonconductive material, is fixedly connected to end wall 26 by a connector 100a, such an adhesive or the like. Power leads 92a, 94a, 96a have respective terminals 102a, 104a and 106a, which are supported by and extend through outer support member 90a. Terminals 102a, 104a, 106a, respectively engage rings 82a, 84a, 86a, which respectively engage leads 42a, 44a, 46a.

Inner slip ring assembly 80a includes an inner support member 108a, which supports motor leads 42a, 44a, 46a, and which is disposed axially inwardly of outer support member 90a. Inner support member 108a, which is composed of an electrically nonconductive material, has an outer surface 110a, which faces inner surface 98a. Outer surface 110a has a plurality of v-shaped grooves 112a, 114a, 116a, which respectively receive brush rings 82a, 84a, 86a.

Rings 82a, 84a, 86a are preferably composed of a liquid metal, such as a liquid mercury. Members 90a and 108a are also composed of defined materials so that the cohesive forces in each of the mercury rings 82a, 84a, 86a are greater than the adhesive forces therein. Opposite surfaces 98a, 110a are separated by a gap 117a of a defined size.

Aligning device 88a includes a pivot pin 118a, which is fixedly connected to inner support member 108a and a pivot bearing 120a, which is fixedly connected to outer support member 90a. Pin 118a and bearing 120a are separated by a predetermined clearance 122a to assure that axial load and transverse load are transmitted from inner support member 108a, through brush rings 82a, 84a, 86a, to outer support member 90a. The thickness of clearance 112a is preferably larger than the thickness of gap 117a.

Embodiment 10a is preferably used where the axial acceleration force is relatively small, but where the radial acceleration force, or a like radial load is relatively large. Terminals 102a, 104a, 106a are preferably fill tubes, which contain the liquid metal. In the manufacture of unit 20a, tubes 102a, 104a, 106a are preferably filled with liquid mercury in a vacuum environment. The inner assembly 80a is formed in a molding operation with the leads 42a, 44a, 46a, molded in place. After the inner assembly 80a is positioned within the outer assembly 78a, the terminal tubes 102a, 104a, 106a are compressed whereby the liquid mercury enters grooves 112a, 114a, 116a. Using a microscope for inspecting mercury rings 82a, 84a, 86a during the manufacturing steps thereof, it is possible to accurately control the width of the mercury rings within the respective v-shaped grooves, and to accurately adjust such widths by adjusting the volume of the mercury within the terminals tubes 102a, 104a, 106a simultaneously therewith. With such steps of manufacture, the difficulty and cost of manufacture are minimized.

A third embodiment 10b of the present invention is shown in FIG. 6. Parts of third embodiment 10b which are like the parts of embodiment 10 have like numerals but with a subscript "b" added thereto. Embodiment 10b (FIG. 6) includes a brush and slip ring unit 20b. Unit 20b includes an outer brush assembly 78b, which is mounted on outer wall 28b, an inner slip ring assembly 80b, which is mounted on inner wall 34b, a plurality of brush rings 82b, 84b, 86b, and an aligning device 88b.

Outer brush assembly 78b includes an outer support member 90b, and a plurality of power leads 92b, 94b, 96b. Outer support member 90b has an inner surface 98b. Member 90b is connected to end wall 26b by a connector 100b. Power leads 92b, 94b, 96b, have respective outer terminal rings 102b, 104b, 106b, which are embedded in inner surface 98b.

Inner slip ring assembly 80b includes an inner support member 108b, which supports motor leads 42b, 44b, 46b. Inner support member 108b has an outer surface 110b, which has a plurality of inner terminal rings 111b, 113b, 115b, that respectively have v-shaped grooves 112b, 114b, 116b, that respectively receive brush rings 82b, 84b, 86b. Rings 82b, 84b, 86b are preferably composed of liquid metal such as liquid mercury. Opposite surfaces 98b, 110b are separated by a gap 117b of preselected size. Aligning device 88b includes a pivot pin 118b and a pivot bearing 120b which have a predetermined clearance 112b therebetween.

Outer terminal rings 102b, 104b, 106b and inner terminal rings 111b, 113b, 115b, which are embedded in their respective support members 90b, 108b, are preferably composed of an iron alloy or a stainless steel material, which is wet by mercury but which is not dissolved by mercury. Members 90b, 108b, in which such terminal rings are respectively embedded, are composed of an electrically non-conducting material.

The above-described third embodiment 10b is preferably used in a gyroscope wherein the axial acceleration force is of relatively small magnitude. With the construction of third embodiment 10b, improved electrical conductivity is provided because liquid metal rings 82b, 84b, 86b have ring-shaped contact surfaces with inner terminal rings 111, 113, 115 and with outer terminal rings 102b, 104b, 106b.

A fourth embodiment 10c of the present invention is shown on FIG. 7. Parts of fourth embodiment 10c which are like the parts of embodiment 10 have like numerals, but with subscript "c" added thereto. Fourth embodiment 10c (FIG. 7) includes a brush and slip ring unit 20c.

Unit 20c includes an outer brush assembly 78c, which is mounted on outer wall 28c, an inner slip ring assembly 80c, which is mounted on inner wall 34c, a plurality of brush rings 82c, 84c, 86c, and an aligning device 88c.

Outer brush assembly 78c includes an outer support member 90c and a plurality of power leads 92c, 94c, 96c. Support member 90c is connected to end wall 28c by a connector 100c. Leads 92, 94, 96c, have respective terminal bars 102c, 104c, 106c. Axially inner slip ring assembly 80c includes an inner support member 108c, which has a plurality of v-shaped grooves 112c, 114c, 114c, 116, that receive liquid metal rings. With the construction of embodiment 10c, the ratio of the axial length to the number of power leads thereof can be substantially minimized in order to facilitate miniaturization of slip ring unit 20c.

A fifth embodiment 10d of the present invention is shown in FIG. 8. Parts of fifth embodiment 10d which are like the parts of embodiment 10 have like numerals, but with a subscript "d" added thereto. Embodiment 10d includes a brush and slip ring unit 20d. Unit 20d includes an outer assembly 78d, an inner assembly 80d, a plurality of brush rings 82d, 84d, 86d, and an aligning device 88d. With the construction of fifth embodiment 10d, a substantial axial acceleration force can be resisted. In addition, with the construction of fifth embodiment 10d, the ratio of the axial length to the number of power leads of assembly 20d can be substantially minimized.

A sixth embodiment 10e of the present invention is shown in FIG. 9. Parts of sixth embodiment 10e which are like the parts of embodiment 10 have like numerals but with the subscript "e" added thereto. Embodiment 10e (FIG. 9) includes a brush and slip ring unit 20e. Unit 20e includes an outer assembly 78e, an inner assembly 80e, a plurality of liquid metal rings 82e, 84e, 86e, and an aligning device 88e.

With the construction of the sixth embodiment 10e, a substantial axial acceleration force can be resisted, a substantial radial acceleration force can be resisted, and the ratio of axial distance to number of power leads of unit 20e can be substantially minimized.

A seventh embodiment 10f of the present invention is shown in FIG. 10. Parts of seventh embodiment 10f which are like the parts of embodiment 10 have like numerals, but with a subscript "f" added thereto. Embodiment 10f includes a brush and slip ring unit 20f. Unit 20f includes an outer assembly 78f, an inner assembly 80f, a plurality of liquid metal rings 82f, 84f, 86f, and an aligning device 88f.

Outer assembly 78f has an outer support member 90f, and inner assembly 80f has an inner support member 108f. Outer support member 90f has an inner surface 98f, and inner support member 108f has an outer surface 110f. Surfaces 98f and 110f are oppositely facing and respectively have the shape of a frustrum of a cone. Outer member 90f also has a surface 99, and inner support member 108f has an oppositely facing surface 111. Surfaces 99 and 111 each has the shape of a frustrum of a cone. In addition, oppositely facing surfaces 99, 111 are disposed radially outwardly of oppositely facing surfaces 98f and 110f. With the construction of seventh embodiment 10f, a substantial radial acceleration force can be resisted, a substantial axial acceleration force can be resisted, and the ratio of axial length to the number of supply leads thereof can be minimized.

In summary, with the construction of the gimbal brush and slip ring unit according to the present invention, a substantial acceleration force can be transmitted through the portions thereof, rubbing friction can be substantially minimized, ease of alignment of the brushes and slip ring portions is provided for ease of manufacture, low-resistance conductive paths through the slip ring unit are provided, and wearing parts are substantially eliminated.

While the present invention has been described in a number of preferred embodiments, it will be obvious to those skilled in the art that various modifications can be made therein within the scope of the invention. It is intended that the appended claims cover all such modifications.

What is claimed is:
1. A gimbal assembly comprising:
an outer gimbal having a longitudinal axis,
an inner gimbal pivotally supported by said outer gimbal coaxially therewith,
a plurality of leads mounted on said inner gimbal for connection to a motor,
a pivot unit pivotally connecting said inner gimbal to said outer gimbal coaxially therewith at one end thereof,
slip ring means pivotally connecting said inner gimbal to said outer gimbal coaxially therewith at the other end thereof, said slip ring means being connected to said motor leads and including an outer brush assembly mounted on said outer gimbal and an inner slip ring assembly mounted on said inner gimbal and a plurality of brush rings disposed therebetween, said outer brush assembly including an outer support member and a plurality of power leads supported thereby, said outer support member having an inner surface, said inner slip ring assembly having an inner support member supporting said motor leads, said inner support member having an outer surface facing said inner surface and having a plurality of axially spaced v-shaped grooves respectively receiving said brush rings, each said brush ring being composed of a liquid metal and being arranged to electrically intercon- nect one of said power leads to one of said motor leads and wherein said pivot unit also includes an outer support member mounted on said outer gimbal and an inner support member mounted on said inner gimbal, said latter outer support member having an inner surface and said latter inner support member having an outer surface, said outer surface having a plurality of v-shaped grooves, and a plurality of liquid mercury rings disposed in the v-shaped grooves between said outer and inner surface of said pivot unit.

2. The gimbal assembly as claimed in claim 1, wherein said outer gimbal is a gyroscope outer gimbal having an outer peripheral wall and a pair of axially spaced end walls enclosing a cavity, and wherein said inner gimbal is a gyroscope inner gimbal having an inner peripheral wall and a pair of axially spaced end walls, and wherein said inner gimbal has a rotor having a shaft fixedly mounted on said inner peripheral wall and having a stator fixedly mounted on said shaft and having a flywheel rotatably mounted on said stator for rotation relative thereto, and wherein said stator is connected to said motor leads.

3. The gimbal assembly as claimed in claim 1, wherein said outer members having an inner surface having a frusto-conical shape and facing said inner surface.

4. The gimbal assembly as claimed in claim 1, wherein said slip ring means has a first aligning device, and wherein said pivot unit has a second aligning device, said first aligning device and said second aligning device being coaxial along said longitudinal axis, each said aligning device including a pivot pin fixedly connected to said inner gimbal and a pivot bearing fixedly connected to said outer gimbal, said pivot pin being journaled in said pivot bearing and having a predetermined clearance disposed therebetween, said clearance being of a selective thickness so that substantially all acceleration loads and impact loads are directed through said liquid mercury rings.

5. The gimbal assembly as claimed in claim 1, wherein said power leads have respective terminal members mounted on said outer support member, said terminal members being respectively disposed adjacent said v-shaped grooves, said terminal members being hollow tubular members containing liquid metal, said tubular members having open end portions respectively facing said v-shaped grooves.

6. The gimbal assembly as claimed in claim 1, wherein said power leads have respective terminal members, said terminal members being metal rings embedded in the inner surface of said outer member, and wherein said motor leads have respective inner terminals, said inner terminals being metal rings embedded in the outer surface of said inner support member, said inner terminal rings having v-shaped grooves for receiving said liquid metal rings.

7. The gimbal assembly as claimed in claim 1, wherein said inner support member has an annular outer portion disposed radially outwardly of said outer support member forming an annular gap therebetween, and wherein at least one of said liquid metal rings is disposed within said annular gap.

8. The gimbal assembly as claimed in claim 1, wherein said outer support member has a second outer surface disposed radially outwardly from and concentric about its said inner surface, said outer surface having a frusto-conical shape, and wherein said inner support member has a second inner surface disposed radially outwardly from and concentric about its said outer surface, said second inner surface of said inner support member having a frusto-conical shape, and wherein at least one of said liquid metal rings is disposed between said second outer surface and said second inner surface.

* * * * *